United States Patent
Yano et al.

(10) Patent No.: US 7,712,818 B2
(45) Date of Patent: May 11, 2010

(54) CAB FOR WORK MACHINE

(75) Inventors: Kouzoh Yano, Osaka (JP); Tatsushi Itoh, Hirakata (JP)

(73) Assignee: Komatsu Ltd., Tokyo (JP)

( * ) Notice: Subject to any disclaimer, the term of this patent is extended or adjusted under 35 U.S.C. 154(b) by 455 days.

(21) Appl. No.: 11/577,076

(22) PCT Filed: May 11, 2006

(86) PCT No.: PCT/JP2006/309505

§ 371 (c)(1),
(2), (4) Date: Apr. 11, 2007

(87) PCT Pub. No.: WO2006/121127

PCT Pub. Date: Nov. 16, 2006

(65) Prior Publication Data

US 2009/0026803 A1    Jan. 29, 2009

(30) Foreign Application Priority Data

May 13, 2005 (JP) .............................. 2005-141336

(51) Int. Cl.
*B60J 1/00* (2006.01)
(52) U.S. Cl. ................ 296/146.16; 296/89; 296/190.08
(58) Field of Classification Search ............. 296/190.1, 296/146.16, 89, 190.01, 190.08
See application file for complete search history.

(56) References Cited

U.S. PATENT DOCUMENTS

| 4,986,593 | A | 1/1991 | Lohmann |
| 6,688,658 | B2 * | 2/2004 | Mori et al. ................... 292/56 |

FOREIGN PATENT DOCUMENTS

| DE | 3150786 A1 | 7/1983 |
| GB | 2 221 952 A | 2/1990 |
| JP | 61-098610 U | 6/1986 |

(Continued)

OTHER PUBLICATIONS

A Korean Office Action (and English translation thereof) dated Oct. 30, 2008, issued in counterpart Korean Application No. 2007-7001388.

(Continued)

*Primary Examiner*—Glenn Dayoan
*Assistant Examiner*—Melissa A Black
(74) *Attorney, Agent, or Firm*—Frishauf, Holtz, Goodman & Chick, P.C.

(57) ABSTRACT

To provide a box-shaped cab for a work machine, on which an operator operates the work machine, having a front surface portion, a rear surface portion, left and right side surface portions, a floor surface portion, and a ceiling surface portion, the cab for a work machine includes: a frame body having a pair of rear side structural members and a pair of lateral side structural members, a pair of rail members each having a vertical portion along the front surface portion and a horizontal portion along the ceiling surface portion; and a rectangular window frame being stored in the front surface portion or the ceiling surface portion, in which the vertical portions of the rail members are directly fixed to the lateral side structural members, and the horizontal portions of the rail members are fixed to the lateral side structural members via intermediate members.

9 Claims, 10 Drawing Sheets

FOREIGN PATENT DOCUMENTS

| | | |
|---|---|---|
| JP | 2-70521 A | 3/1990 |
| JP | 03-65761 U | 6/1991 |
| JP | 06-087456 U | 12/1994 |
| JP | 07-108617 B2 | 11/1995 |
| JP | 11-200693 A | 7/1999 |
| JP | 2000-310073 A | 11/2000 |
| JP | 2001-207479 A | 8/2001 |
| JP | 2002-088814 A | 3/2002 |
| JP | 2004-106824 A | 4/2004 |
| JP | 2005-161994 A | 6/2005 |
| JP | 3732728 B2 | 10/2005 |

OTHER PUBLICATIONS

A Great Britain Office Action dated Nov. 20, 2008, issued in counterpart Great Britain Application No. 0700216.5.

International Preliminary Report on Patentability, Chapter I of the Patent Cooperation Treaty,and Written Opinion for PCT/JP2006/309505, dated Nov. 13, 2007. 4 sheets.

Japanese Office Action dated Aug. 25, 2009 (1 page), and English translation thereof (2 pages), issued in counterpart Japanese Application Serial No. 2007-528320.

* cited by examiner

CAB FOR WORK MACHINE

This application is a U.S. National Phase Application under 35 USC 371 of International Application PCT/JP2006/309505 filed May 11, 2006.

TECHNICAL FIELD

The present invention relates to a cab for work machine, on which an operator operates the work machine.

BACKGROUND ART

A work machine (such as a hydraulic excavator and a bulldozer) includes a vehicle body provided with a traveling device, an work implement provided on the vehicle body, and a cab for work machine provided on the vehicle body and serving as a driving room, on which an operator operates the work implement and the traveling device.

The cab for work machine includes a frame body formed by welding ends of a plurality of steel pipe members to each other, sheet metal members to cover the side surfaces of the frame body. Rigidity of the cab is ensured by the frame body formed by welding the steel pipe members to each other. On the other hand, the cab for work machine is provided with a window frame and the like to which a windowpane and the like is mounted.

An opening/closing mechanism for an opening member such as a window frame and a door includes a hinge mechanism, which is provided on one end of the side edge of the opening member, and a slide mechanism for sliding the window frame and the door along the side surface of the cab for work machine.

Conventionally, there has been known a slide type opening/closing mechanism in which a rail is attached along a pipe member that forms a frame body, so that a window frame, a door or the like is slidably supported by the rail. As such a slide type opening/closing mechanism, there has been known an arrangement in which a pair of pipe members, which form the frame body and have deformed cross section, opposing each other are employed, and each of the pipe members has a rail incorporated thereinto (refer to, for example, Patent Document 1).

Further, as such a slide type opening/closing mechanism, there has been known another arrangement in which a pair of rails are directly fixed along, by means of welding or the like, a pair of pipe members, which form a frame body, opposing each other (refer to, for example, Patent Document 2).

[Patent Document 1] Japanese Patent Laid-Open Publication No. 2001-207479 (Paragraph Number [0027], Paragraph Number [0028], FIG. 1, FIG. 2 and others)

[Patent Document 2] Japanese Patent Laid-Open Publication No. 2004-106824 (Paragraph Number [0027], FIG. 2 and others)

DISCLOSURE OF THE INVENTION

Problems to be Solved by the Invention

However, in the attaching structure of the rail described in Patent Document 1 and Patent Document 2, the rail is directly attached to the pipe member that forms the frame body. In the case where a structure in which the window frame of the slide type opening/closing mechanism is stored from a front surface of the cab into a ceiling surface is adopted, it will be necessary to provide a rail that has a vertical portion along the front surface and a horizontal portion along the ceiling surface, so that there will arise a problem that, when attaching the rail member to the steel pipe member, vertical and horizontal accuracy will be difficult to achieve.

An object of the present invention is to provide a cab for work machine in which a rail member can be attached to a frame body with high accuracy.

Means for Solving the Problems

A box-shaped cab for work machine according to a first aspect of the present invention is a box-shaped cab for work machine, on which an operator operates the work machine, having a front surface portion, a rear surface portion, left and right side surface portions, a floor surface portion, and a ceiling surface portion, the cab for work machine including: a frame body having a pair of rear side structural members and a pair of lateral side structural members, the rear side structural members being respectively erected from both ends of the floor surface portion on rear surface side to support the rear surface portion, the lateral side structural members being respectively erected from both ends of the floor surface portion on front surface side, bent along the front surface portion and the ceiling surface portion, and connected to upper ends of the rear side structural members; a pair of rail members respectively fixed to the pair of lateral side structural members in such a manner that grooves of the rail members are opposed to each other, the pair of rail members each having a vertical portion along the front surface portion and a horizontal portion along the ceiling surface portion; and a rectangular window frame slidably mounted to the grooves of the pair of the rail members, the window frame being stored in the front surface portion or the ceiling surface portion, in which the vertical portions of the rail members are directly fixed to the lateral side structural members, and the horizontal portions of the rail members are fixed to the lateral side structural members via intermediate members.

According to a second aspect of the present invention, it is preferred that in the first aspect of the present invention, the rail members each have a bent portion for integrally connecting the vertical portion and the horizontal portion to each other.

According to a third aspect of the present invention, it is preferred that in the second aspect of the present invention, the window frame has, at its four corners, sliding rollers that are inserted into the grooves of the rail members; a lower end of the vertical portion of each of the rail members is provided with a curved portion that curves forward from the front surface portion; the bent portion of each of the rail members is provided with a projected portion that projects toward the front side of the front surface portion; and the sliding rollers of the window frame are stored in the curved portions and the projected portions of the rail members when the window frame is mounted to the front surface portion.

According to a fourth aspect of the present invention, it is preferred that in any one of the first to third aspects of the present invention, the vertical portion of each of the rail members is arranged at a position offset from the axis of the lateral side structural member in a direction orthogonal to the axis, and is fixed to the lateral side structural member in a cantilevered state.

According to a fifth aspect of the present invention, it is preferred that in any one of the first to third aspects of the present invention, the window frame is provided with a lock mechanism for storing and fixing the window frame to the front surface portion or the ceiling surface portion; the intermediate member is formed as a long-sized plate-like body extending along the horizontal portion of the rail member, and a front end and a rear end of the intermediate member are provided with a pair of tongue piece portions dangling down respectively in the vicinity of the front surface portion and in the vicinity of the rear surface portion; an indoor side surface of each of the tongue piece portions is provided with an engaging pin that projects inwardly; and the window frame is stored and fixed in the front surface portion by engaging the lock mechanism with the engaging pin in the vicinity of the front surface portion, and the window frame is stored and fixed in the ceiling surface portion by engaging the lock mechanism with the engaging pin in the vicinity of the rear surface portion.

Effect of the Invention

According to the first aspect of the present invention, the horizontal portions of the rail members are fixed to the lateral side structural members, which form the frame body, via the intermediate members. Accordingly, non-uniformity of the attaching precision caused when directly fixing the vertical portions of the rail members to the lateral side structural members can be absorbed by the intermediate members, and therefore the rail members can be fixed to the lateral side structural members with high precision.

Particularly, the present invention can be well applied to the case where the rail members have the bent portions for integrally connecting the vertical portions and the horizontal portions to each other as described in the second aspect of the present invention, and the rail members can be fixed to the lateral side structural members with high precision.

According to the third aspect of the present invention, the lower ends of the vertical portions of the rail members curve, and the projected portions are formed in the bent portions. Accordingly, when storing and fixing the window frame in the front surface portion, the sliding rollers can be stored in tip ends of the curved portions and the projected portions, and therefore the window frame can be well stored in the front surface portion.

According to the fourth aspect of the present invention, the vertical portion of each of the rail members is arranged at a position offset from the axis of the each of the lateral side structural members in a direction orthogonal to the axis, and therefore is fixed to each of the lateral side structural members in a cantilevered state. Accordingly, even when distortion is caused on the structural members by welding or the like, distortion caused on the rail members can be reduced, and therefore the rail members can be attached to the frame body with high degree of parallelization, and enormous man-hours for correcting of the pair of the rail members is eliminated.

According to the fifth aspect of the present invention, the horizontal portion of the rail member is provided with the tongue piece portions, and the tongue piece portions are provided with the engaging pins. Accordingly, the lock mechanism for storing and fixing the window frame to the front surface portion or the ceiling surface portion can be engaged only by attaching the rail member to the lateral side structural member, so that the number of the components can be reduced, and labor hours for manufacturing the cab can be considerably reduced.

Further, since it is not necessary to separately provide an engaging structure of the lock mechanism on the lateral side structural member, the number of welding to the lateral side structural members is reduced, and therefore the possibility of causing distortion can be reduced.

EXPLANATION OF CODES

5 ... cab for work machine, 5A ... front surface portion, 5B ... left and right side surface portions, 5C ... rear surface portion, 5D ... floor surface portion, 5E ... ceiling surface portion, 51 ... frame body, 56 ... rail member, 56C ... bent portion, 60 ... intermediate member, 62, 63 ... tongue piece portion, 513 ... pipe member (lateral side structural member), 542 ... window frame, 543 ... sliding roller, 544 ... lock mechanism, 561 ... curved portion, 562 ... projected portion, 621, 631 ... engaging pin.

BEST MODE FOR CARRYING OUT THE INVENTION

Preferred embodiment of the present invention will be described below with reference to the attached drawings.

(1) Entire Construction

Figure 1:
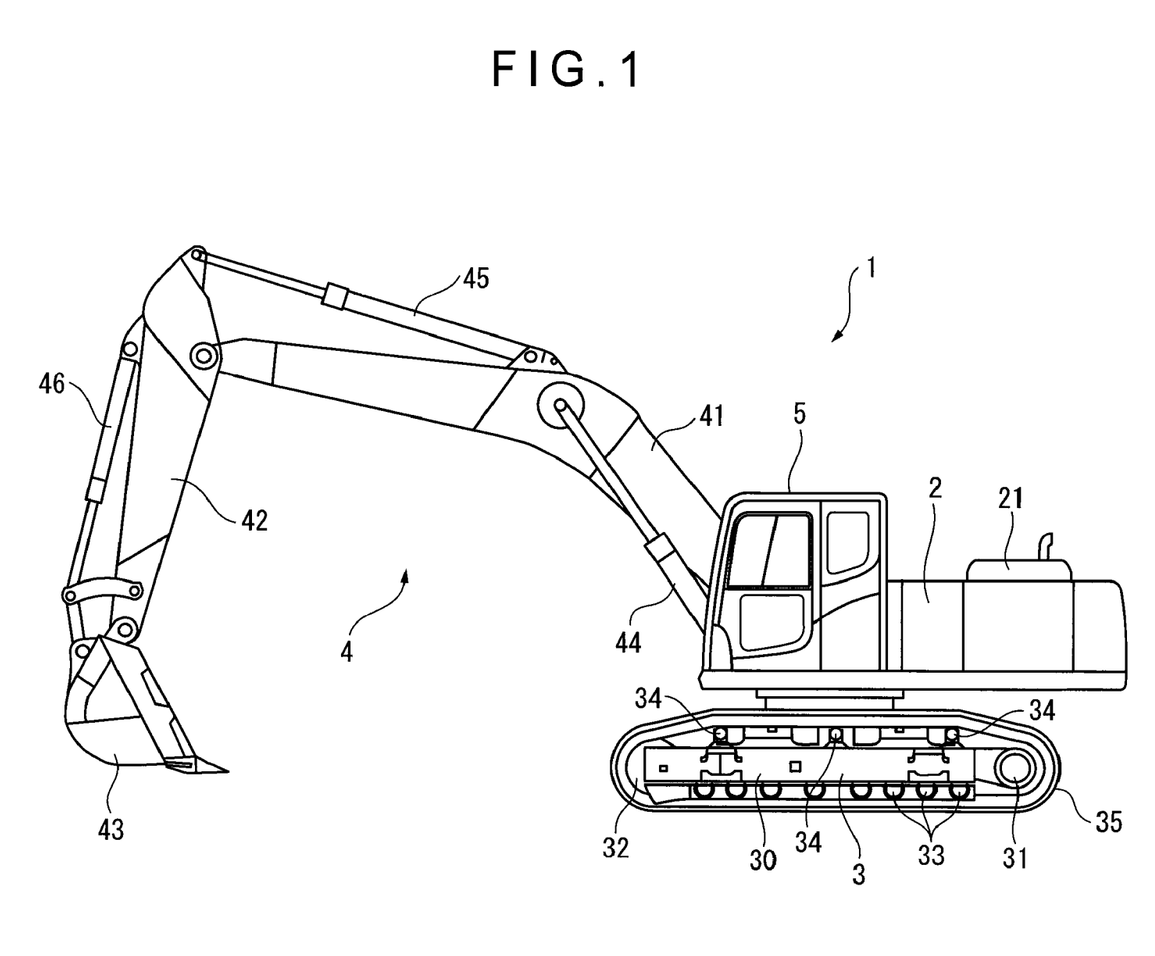
FIG. 1 is a side view showing the configuration of a work machine of an embodiment of the present invention.

FIG. 1 shows a hydraulic excavator 1 as a work machine of the embodiment of the present invention. The hydraulic excavator 1 includes a vehicle body 2, a traveling device 3, an work implement 4 and a cab for work machine 5.

The vehicle body 2 is provided with the work implement 4, the cab for work machine 5, the engine 21, and a hydraulic circuit (not shown) driven by the engine 21, the work implement 4 being arranged on the front side of the vehicle, the cab for work machine 5 being arranged substantially on the central portion of the vehicle, the engine 21 being arranged on the rear side of the vehicle.

The traveling device 3 is provided below the vehicle body 2 and is adapted to support the vehicle body 2 so that the vehicle body 2 can rotate in the horizontal direction. The traveling device 3 has a pair of traveling bodies 30 extending along the traveling direction of the vehicle. Each of the traveling bodies 30 includes a driving tumbler 31, an idle tumbler 32, track rollers 33, carrier rollers 34, and a crawler 35 wound around these components.

The work implement 4 includes a boom 41, an arm 42 and a bucket 43. The boom 41 is pivoted to a main frame, which constitutes the vehicle body 2, so that the boom 41 can swing vertically. The arm 42 is swingably mounted on a tip end of the boom 41. The bucket 43 is mounted on a tip end of the arm 42.

A boom cylinder 44 is swingably mounted on the vehicle body 2 along the boom 41. A tip end portion of the boom cylinder 44 is connected to substantially the central portion of the boom 41. An arm cylinder 45 is mounted on a curved portion of substantially the central portion of the boom 41, the arm cylinder 45 can swing with respect to the boom 41. A tip end portion of the arm cylinder 45 is connected to a base end portion of the arm 42.

Further, a bucket cylinder 46 is swingably mounted on the base end portion of the arm 42, and a tip end portion of the bucket cylinder 46 is connected to a base end portion of the bucket 43.

In the work implement 4, pressure oil is supplied from the hydraulic circuit provided inside the vehicle body 2. The cylinders 44, 45, 46 are extended and contracted, driven by the pressure oil, so that the bucket 43 can be moved vertically, or the attitude of the bucket 43 can be changed according to necessity to perform various work such as excavation work, leveling work, earth and sands loading work and the like.

The work implement 4 can be operated by an operator who rides on the cab for work machine 5 (that serves as an operation room) by using an operating lever provided in the cab for work machine 5.

(2) Structure of Cab for Work Machine 5

(2-1) Arrangement of Cab for Work Machine 5

Figure 2:
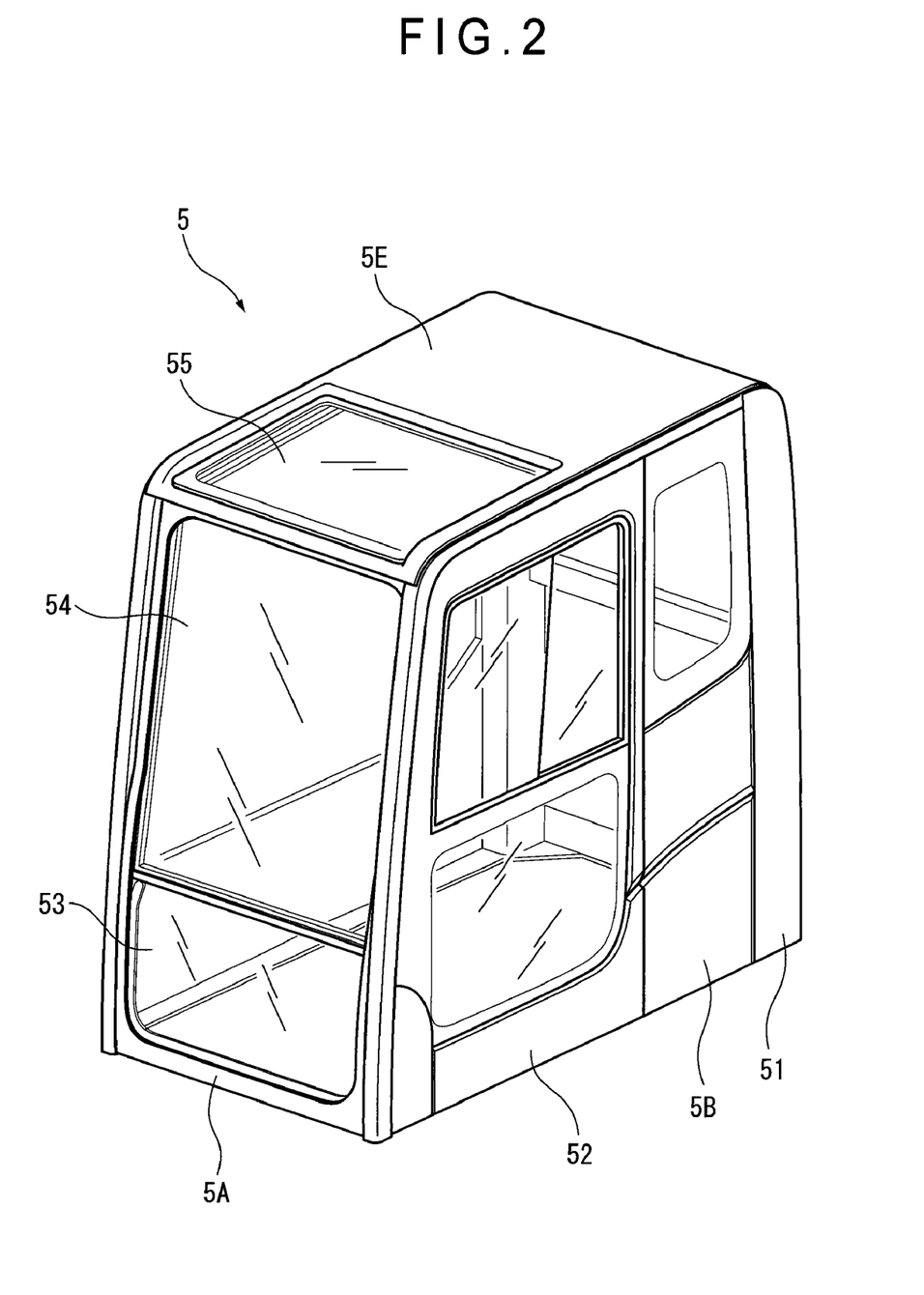
FIG. 2 is a perspective view showing the configuration of a cab for work machine of the embodiment.
Figure 3:
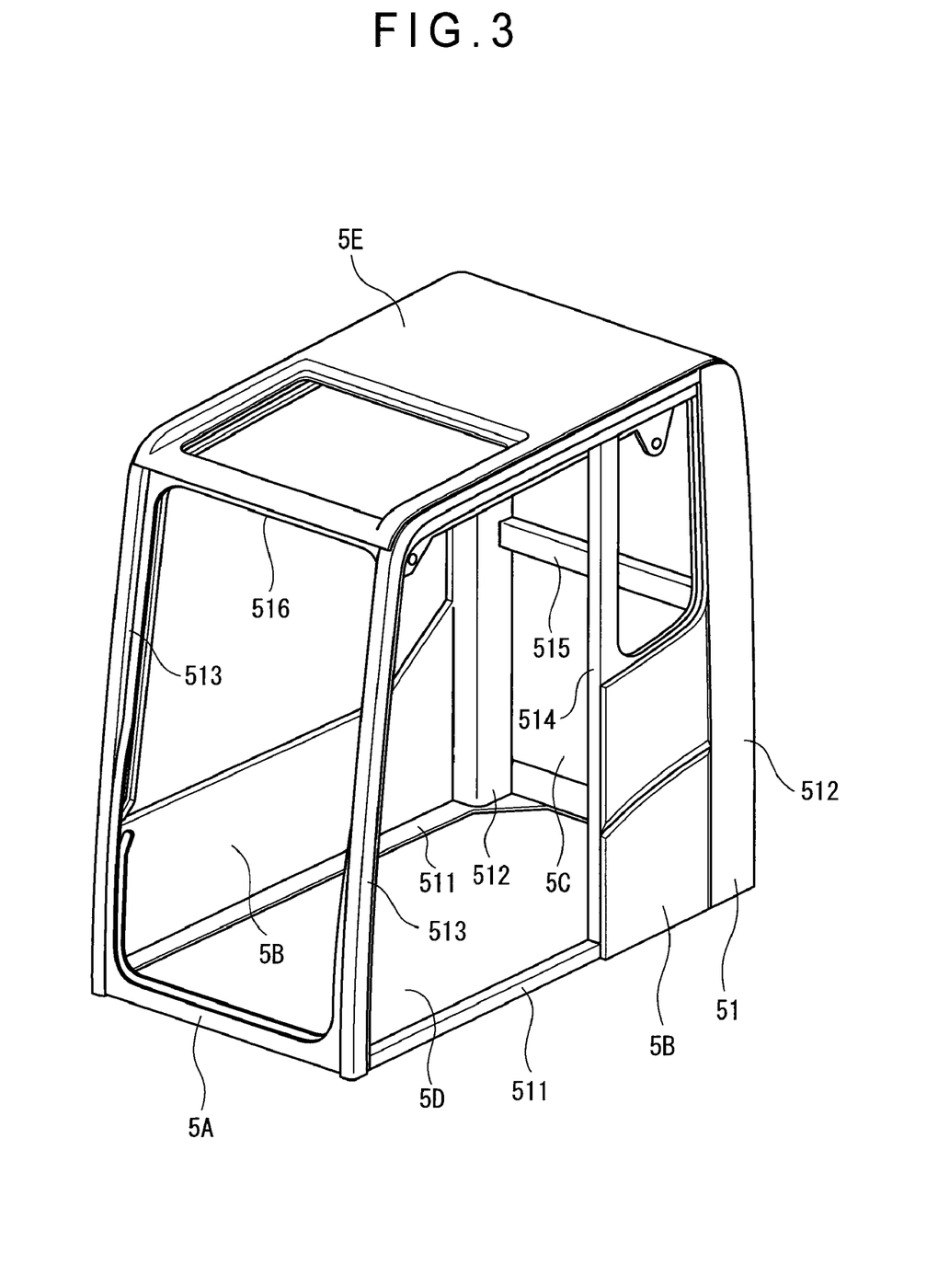
FIG. 3 is a perspective view showing the configuration of a frame body of the cab for work machine of the embodiment.

FIGS. 2 and 3 are perspective views showing the appearance of the cab for work machine 5, the FIG. 2 showing a state where glass windows are mounted, the FIG. 3 showing a state where glass windows are dismounted.

The cab for work machine 5, which serves as the operation room, of the hydraulic excavator 1 shows a box shape which includes a front surface portion 5A, left and right side surface portions 5B, a rear surface portion 5C, a floor surface portion 5D, and a ceiling surface portion 5E. The front surface portion 5A, the left and right side surface portions 5B, the rear surface portion 5C, and the ceiling surface portion 5E are supported by a frame body 51 provided on the floor surface portion 5D.

Further, a door 52, which is formed by fitting a windowpane into a frame-like member, is openably/closably mounted substantially at the center of the left side surface portion 5B.

As shown in FIG. 2, glass windows 53, 54 are mounted in the front surface portion 5A, and a glass window 55 is mounted in the ceiling surface portion 5E.

The glass window 53 covers a lower portion of the front surface of the cab for work machine 5. The glass window 54 is arranged above the glass window 53. The glass window 54 is slidably mounted to the frame body 51 via a rail member, and can be moved from the front side of the frame body 51 to the ceiling side (the details will be described later).

As shown in FIG. 3, the frame body 51 includes a rectangular frame-like base 511 provided on a bottom portion of the frame body 51, columns 512 serving as rear side structural members erected from corners at a rear end of the base 511, and pipe members 513 serving as lateral side structural members extending from corners at a front end of the base 511 toward upper ends of respective columns 512. Further, the base 511 is provided with, at left side in its middle portion in the traveling direction of the vehicle, a middle column 514. The upper end of the middle column 514 is connected to the pipe member 513. A horizontal member 515 extending along the width direction of the cab is provide to connect middle portions of respective columns 512.

Further, a horizontal member 516 is mounted to L-shaped corners of a pair of pipe members 513 respectively provided along the side surfaces of the cab for work machine 5, the horizontal member 516 connecting the pair of pipe members 513.

Figure 4:
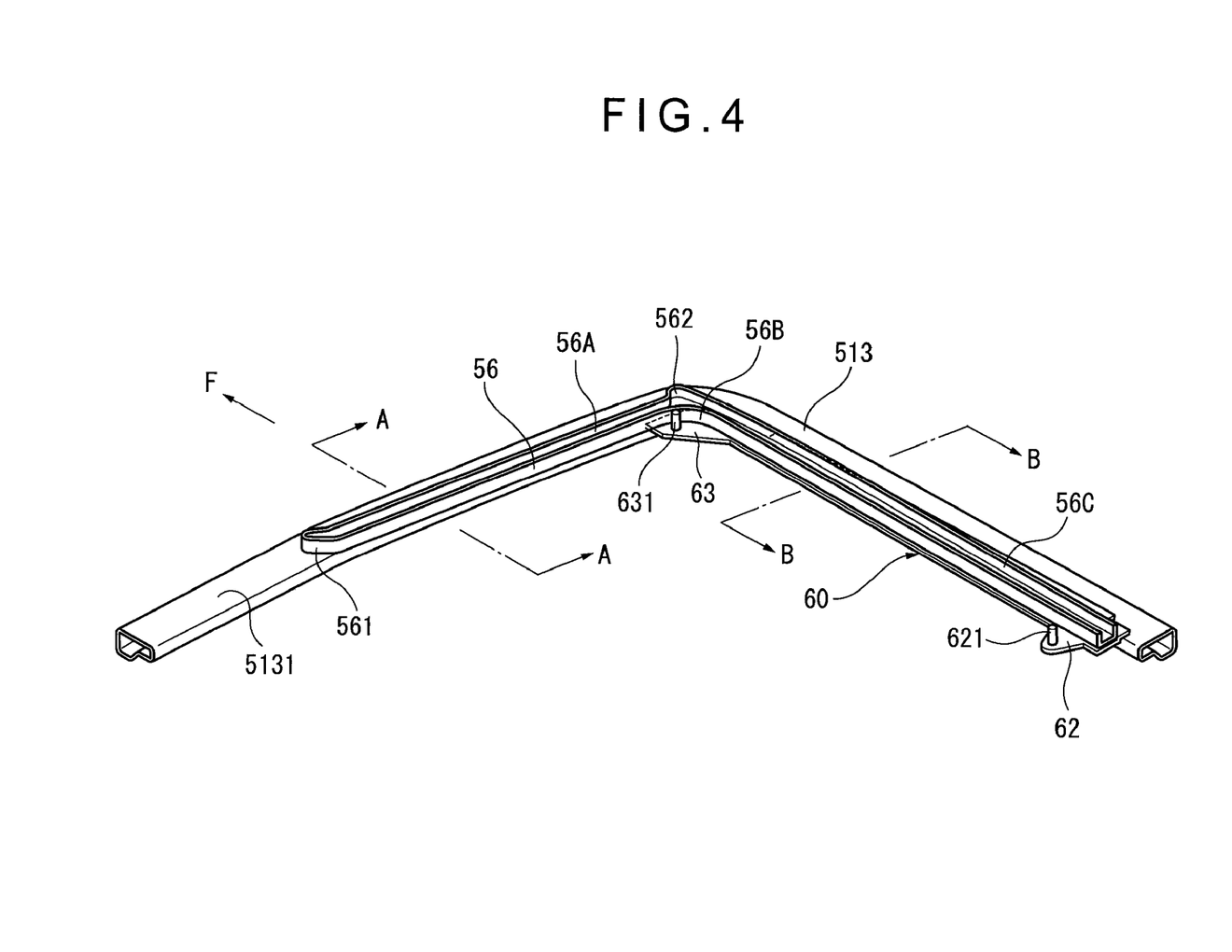
FIG. 4 is a perspective view showing the configuration of a structural member and a rail member of the embodiment.

As shown in FIG. 4, each of the pipe members 513 is formed by a deformed pipe member having a partially recessed rectangular cross section. As shown in FIG. 3, each of the pipe members 513 is formed to show an L-shape (in side view) that is erected from a width-directional end of the front side of the floor surface portion 5D of the cab for work machine 5 and is connected to the upper end portion of the column 512. A rail member 56 having an L-shaped side view is provided along the pipe member 513 from the front portion to the ceiling portion.

The rail member 56 is formed by a steel member having U-shaped cross section. The rail member 56 is mounted to the indoor surface 5131 of each of the pair of right and left pipe members 513, so that when the pipe members 513 are assembled into the frame body 51, the recessed portions of the U-shape of the rail members 56 are opposed to each other.

The rail member 56 includes a vertical portion 56A extending along the vertical direction of the pipe member 513 and a horizontal portion 56B extending along the horizontal direction of the pipe member 513, the vertical portion 56A and the horizontal portion 56B being integrally connected to each other via a bent portion 56C. Further, the rail member 56 is provided with a curved portion 561 at its lower end, and a projected portion 562 at its L-shaped bent portion. The curved portion 561 curves toward the front side F of the cab for work machine 5, and the projected portion 562 projects toward the front outer side of the cab for work machine 5.

Figure 5:
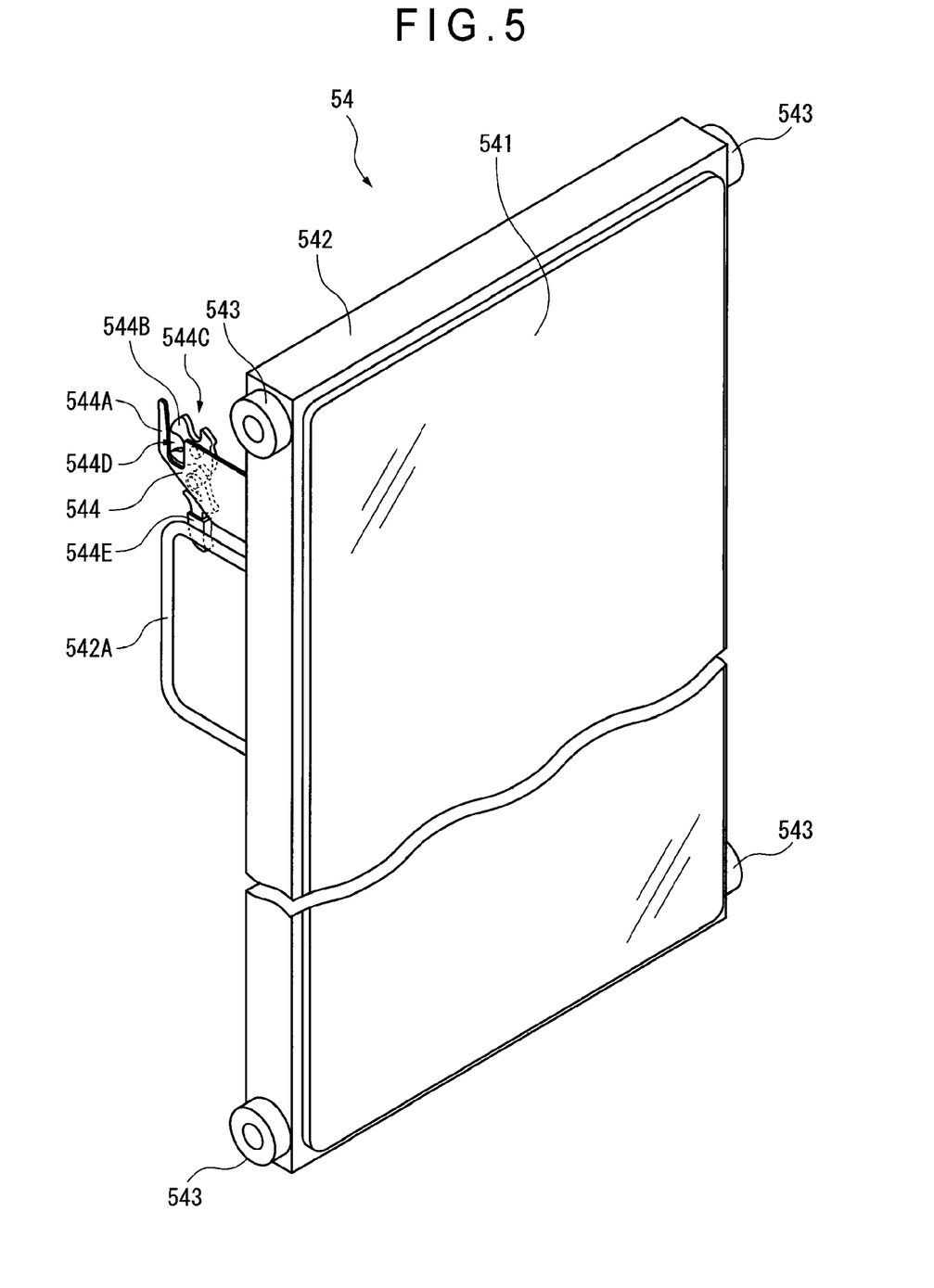
FIG. 5 is a partial perspective view showing the configuration a window of the embodiment.

As shown in FIG. 5, the glass window 54 includes a windowpane body 541, a window frame 542, sliding rollers 543, and a lock mechanism 544.

The windowpane body 541 includes a rectangular plate-shaped translucent glass, and a gasket (not shown in FIG. 5) provided on the outer peripheral surface.

The window frame 542 is formed by a steel-made rectangular body provided on the rear surface of the windowpane body 541. The window frame 542 and the windowpane body 541 are bonded to each other with an elastic adhesive such as silicone or the like. Further, a handle 542A is provided on the rear surface of the window frame 542, namely on the surface facing the interior of the cab for work machine 5.

The sliding rollers 543 are fitted into the recessed portion of the rail member 56 to smoothly slide the glass window 54, the sliding rollers 543 being rotatably mounted on the side surfaces of the rectangular window frame 542 at four places near the corners.

The lock mechanism 544 includes a plate-like portion 544A that projects in an out-of-plane direction of the rear surface of the window frame 542, and a lock portion 544B rotatably mounted to the plate-like portion 544A. The lock portion 544B is provided with recessed portions 544C, 544D, to which pins of an intermediate member (which will be described later) are engaged. A lever 544E for positioning and fixing the lock portion 544B is rotatably attached to the plate-like portion 544A. An end portion of the lever 544E abuts on an end portion of the lock portion 544B, so that the rotation of the lock portion 544B is allowed or restricted according to the rotational position of the lever 544E.

Figure 6:
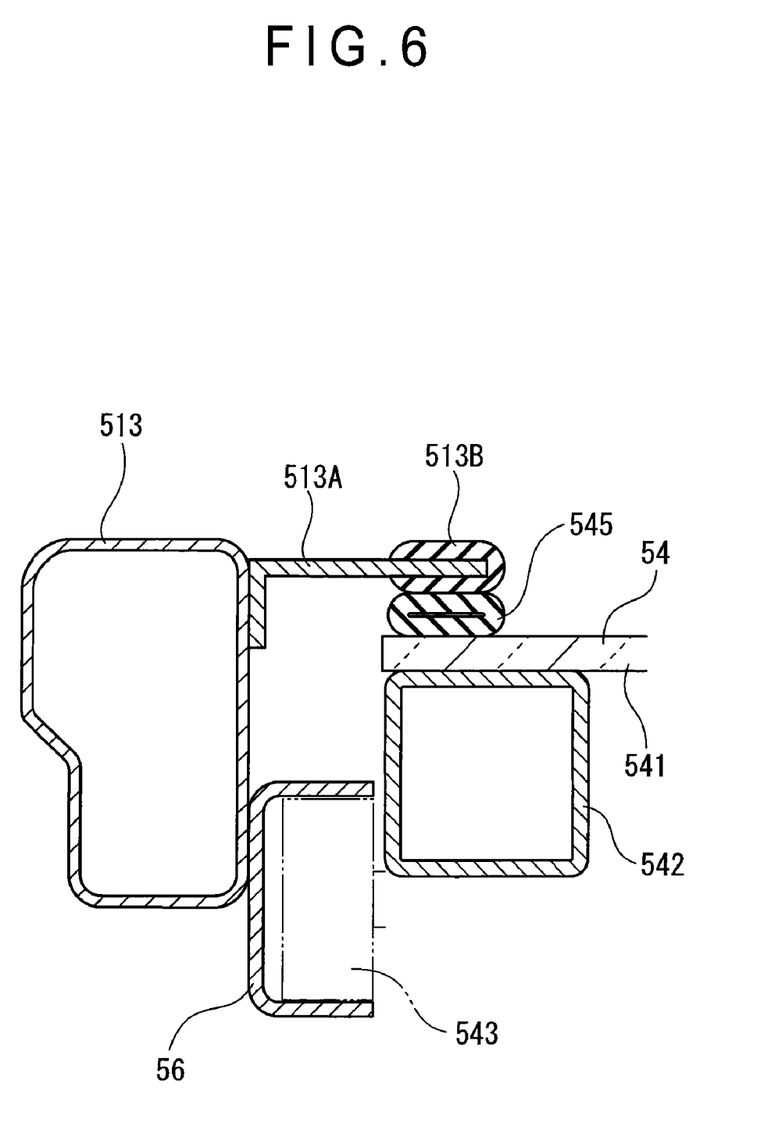
FIG. 6 is a detailed cross section taken along line A-A of FIG. 4.

As shown in FIG. 6 (which is a cross section taken along line A-A of FIG. 4), the rail member 56 is directly attached to the pipe member 513 on the front side in the traveling direction of the cab for work machine 5, and the glass window 54 is slidably mounted to the inner recessed portion of the rail member 56.

Namely, the rail member 56 is arranged at a position offset from the center (axis) of the pipe member 513 to the indoor side of the cab, so that the rail member 56 is fixed in a cantilevered state in which one end portion of the rail member 56 on the indoor side does not abut on the pipe member 513.

Further, a bracket 513A extending along an extending direction of the pipe member 513 is welded to one end portion of the pipe member 513 on the outdoor side, the bracket 513A having an L-shaped cross section. A gasket 513B is linearly provided along a tip end of the L-shape of the bracket 513A.

The glass window 54 is mounted through fitting a sliding roller 543 into the recessed portion of the rail member 56. A gasket 545 provided along the outer periphery of the window-pane body 541 on the outdoor side is brought into pressure contact with the gasket 513B provided to the bracket 513A by a lock mechanism 544 (not shown in FIG. 6), thereby ensuring airtightness of the cab for work machine 5.

Figure 7:
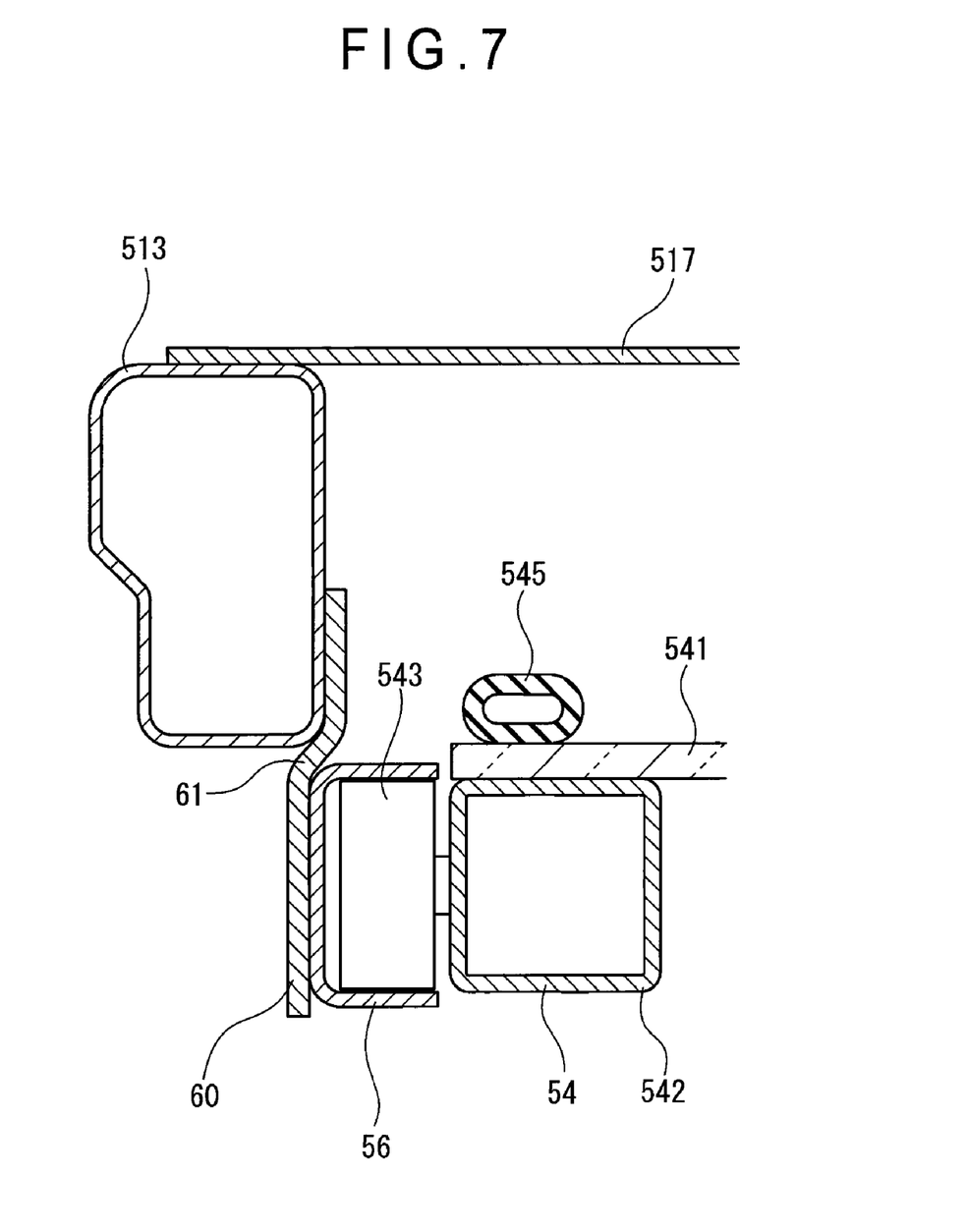
FIG. 7 is a detailed cross section taken along line B-B of FIG. 4.

As shown in FIG. 7 (which is a cross section taken along line B-B of FIG. 4), when the glass window 54 is in the ceiling position, the rail member 56 is jointed and fixed to the pipe member 513 via an intermediate member 60, and the glass window 54 mounted to the rail member 56 is mounted in such a state that the glass window 54 can slide below a top board 517 of the cab for work machine 5.

The intermediate member 60 is formed as a long plate-like body extending along the ceiling portion of the pipe member 513. The intermediate member 60 has a slightly curved stepped portion 61 formed substantially at a central portion in the width direction of the plate-like body. In the intermediate member 60, the upper side of the stepped portion 61 is welded and fixed to the pipe member 513, and the lower side of the stepped portion 61 is fixed to the pipe member 513 in a cantilevered state. The rail member 56 is welded to the inner side of the intermediate member 60.

Further, as shown in FIG. 4, a front side end of the intermediate member 60 and a rear side end of the intermediate member 60 are respectively provided with tongue piece portions 62, 63 dangling down, and the tongue piece portions 62, 63 are respectively provided with engaging pins 621, 631 projecting to the indoor side of the cab. The recessed portions 544C, 544D of the lock mechanism 544 of the glass window 54 are respectively engaged with the engaging pins 621, 631, so that the glass window 54 is held.

(2-2) Manufacturing Steps of Cab for Work Machine 5

At the time of manufacturing the cab for work machine 5, the columns 512 are first connected and fixed to the rear end portion of the base 511 by welding or the like, and then the middle column 514 is elected, and the horizontal member 515 is connected.

Then, the pipe members 513, each having the rail member 56 mounted thereto in advance, are respectively connected to the corners at the front side of the base 511, and the upper end surface of the middle column 514 and the upper end surface of the column 512 are respectively connected to the lower surfaces of the pipe members 513 by welding.

Further, the horizontal member 516 is respectively welded, at the L-shaped portions of the pipe members 513, to the side portions of the pipe members 513, so that the frame body 51 is formed.

Finally, the sheet metal members are mounted so as to cover the frame body 51, the door 52 is mounted to the middle column 514 via a hinge or the like, and the glass windows 53, 54, 55 are mounted.

(3) Operations of Cab for Work Machine 5

Operations of the cab for work machine 5 having the arrangement of above will be described below.

Figure 8:
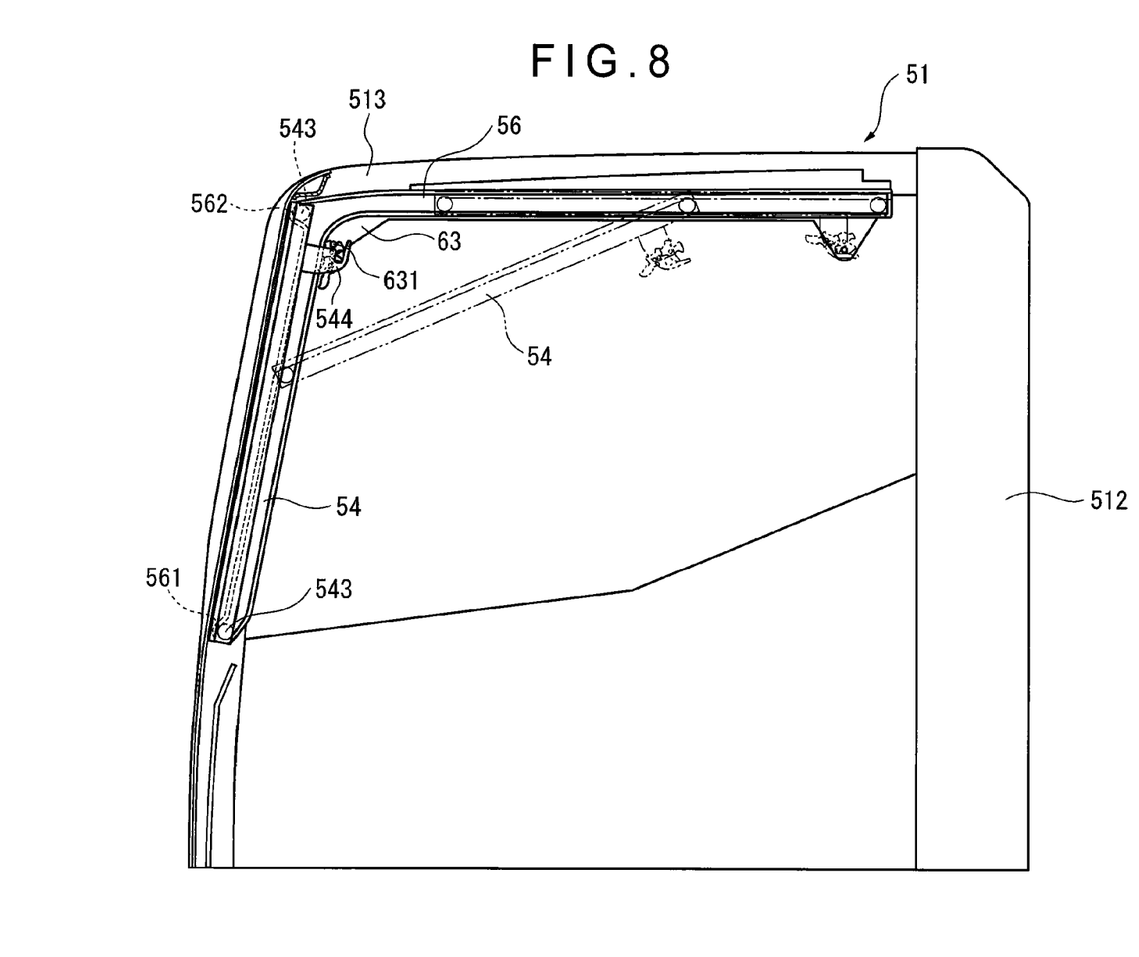
FIG. 8 is a side view showing an inner surface to help to describe the advantages of the embodiment.
Figure 9:
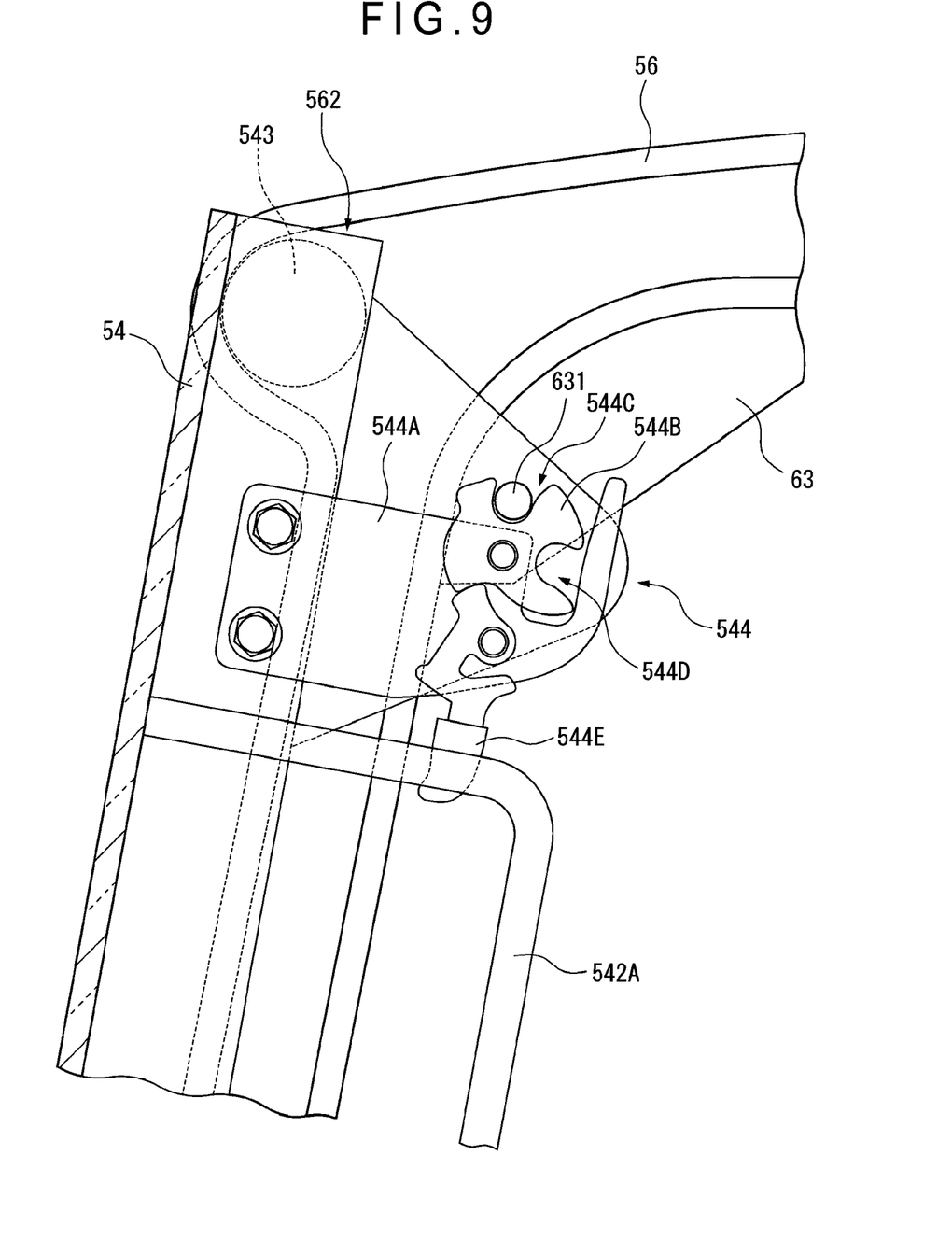
FIG. 9 is a partial side view showing a state where a window frame of the embodiment is stored fixed in a front surface portion.

As shown in FIG. 8, in a state where the glass window 54 is stored and fixed in the front surface portion 5A, the sliding rollers 543 in the lower end portion of the glass window 54 are stored in the tip end portion of the curved portions 561 at the lower end of the rail members 56, and the sliding rollers 543 in the upper end portion of the glass window 54 are stored in the projected portion 562 formed in the rail member 56 as shown in FIG. 9.

In this state, since the recessed portion 544C formed in the lock portion 544B of the lock mechanism 544 is engaged with the engaging pin 631, the glass window 54 is biased toward the front side and is therefore fixed.

As shown in FIG. 9, when the lever 544E of the lock mechanism 544 is rotated counterclockwise, the engagement of the lock portion 544B with the lever 544E will be released, the lock portion 544B will become rotatable, and the engagement of the recessed portion 544C with the engaging pin 631 will be released.

When the operator grasps the handle 542A of the glass window 54 to push the glass window 54 backward and upward, the sliding rollers 543 in the lower end portion of the glass window 54 will slide along the vertical portion of the rail member 56, and at the same time the sliding rollers 543 in the upper end portion of the glass window 54 will slide along the horizontal portion of the rail member 56. As a result, the glass window 54 will move obliquely upward.

Figure 10:
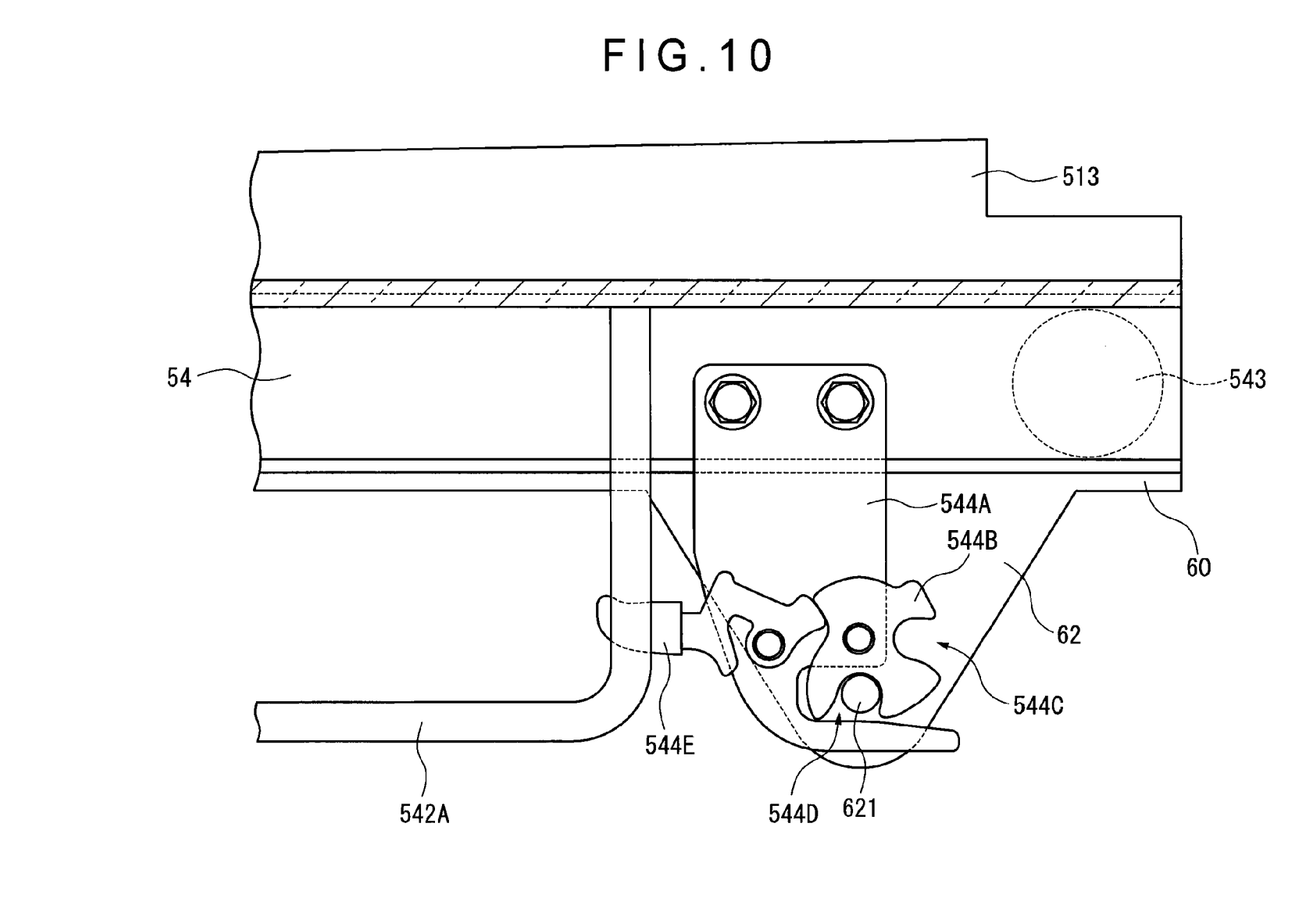
FIG. 10 is a partial side view showing a state where a window frame of the embodiment is stored and fixed in a ceiling surface portion.

As shown in FIG. 10, when the whole glass window 54 is moved to the ceiling portion, the recessed portion 544D formed on the lock portion 544B of the lock mechanism 544 will be engaged with the engaging pin 621 of the tongue piece portion 62 on the rear side end of the intermediate member 60, so that the rotation of the lock portion 544B is restricted by the lever 544E, and the glass window 54 is stored and fixed in the ceiling portion.

To move the glass window 54 stored and fixed in the ceiling portion to the front portion, the operator rotates counterclockwise the lever 544E of the lock mechanism 544 so as to release the engagement of the lock portion 544B, grasps the handle 542A to slide the glass window 54 toward the front side of the cab, and further, slides the glass window 54 downward along the vertical portion of the rail member 56.

When the sliding rollers 543 at the lower end of the glass window 54 reach the curved portion 561 of the rail member 56, the operator pushes the glass window 54 toward the front side of the cab while pushing the sliding rollers 543 toward the tip ends of the curved portions 561.

After the sliding rollers 543 at the lower end are stored into the lower end of the curved portion 561 in the front portion of the cab, the sliding rollers 543 at the upper end is pushed into the projected portion 562 formed in the rail member 56, the recessed portion 544C of formed in the lock portion 544B of the lock mechanism 544 is engaged with the engaging pin 631, and the lever 544E is rotated to fix the lock portion 544B.

In the case of a hydraulic excavator 1, when the bucket 43 works in high position, by storing the glass window 54 to the ceiling portion in the above manner, the hydraulic excavator 1 can be operated while directly visually observing the bucket 43.

Further, since the arrangement is such that the glass window 54 is slid along the rail member 56 so as to be stored in the ceiling portion, there is no trouble about a storing space when the glass window 54 is wanted to be dismounted, and the glass window 54 will not be an obstacle due to the narrow cab for work machine 5.

(4) Advantages of Embodiment

According to the present embodiment, the rail member 56 is arranged at a position offset from the pipe member 513, and thereby is bonded and fixed in a cantilevered state. Accordingly, even when welding distortion or the like is caused on the pipe member 513 when assembling the frame body 51, the influence of the distortion to the rail member 56 can be reduced. Hence, even if the welding of the pipe member 513 is performed after the rail member 56 is attached, the rail member 56 will not undergo torsion, and thereby degree of parallelization of the pair of the rail members 56 can be secured.

Particularly, since the rail member 56 is welded to the pipe member 513 via the intermediate member 60 in the ceiling portion, the influence of the welding distortion of the pipe member 513 can be further reduced.

Since the rail member 56 which having a complicated L-shape in side view is arranged at a position offset from the pipe member 513, and further, since the rail member 56 is attached via the intermediate member 60 in the ceiling portion, degree of parallelization of the rail members 56 can be further secured.

(5) Modifications of Embodiment

The present invention is not limited to the above embodiment but includes the following modifications.

Although, in the above embodiment, the present invention is applied to the cab for work machine 5 of the hydraulic excavator 1, the present invention is not limited thereto but can be applied to other work machines such as a wheel loader. Particularly, the present invention can be well applied to a work machine whose work implement works in high position.

Further, although in the present embodiment, the pipe member 513 and the rail member 56 are welded via the long-sized plate-like intermediate member 60 in the ceiling portion, the present invention is not limited thereto. For example, the structural member and the rail member can be welded and fixed via a plurality of piece-like intermediate members.

Although in the above embodiment, the present invention is applied to the glass window 54 movable between the front side and the ceiling side of the cab for work machine 5, the present invention is not limited thereto but can be applied to, for example, a glass window having a simple sliding structure.

It is to be understood that, when implementing the present invention, the detail structure, shape and the like can be changed as long as the objects of the present invention can be achieved.

INDUSTRIAL APPLICABILITY

The present invention can be applied to a hydraulic excavator as well as other work machines such as a wheel loader.

The invention claimed is:

1. A box-shaped cab for a work machine, in which an operator operates the work machine, having a front surface portion, a rear surface portion, left and right side surface portions, a floor surface portion, and a ceiling surface portion, the cab comprising:

a frame body having a pair of rear side structural members and a pair of lateral side structural members, the rear side structural members being respectively erected from both ends of the floor surface portion on a rear surface side to support the rear surface portion, the lateral side structural members being respectively erected from both ends of the floor surface portion on a front surface side, bent along the front surface portion and the ceiling surface portion, and connected to upper ends of the rear side structural members;

a pair of rail members respectively fixed to the pair of lateral side structural members such that grooves of the rail members are opposed to each other, the pair of rail members each having a vertical portion along the front surface portion and a horizontal portion along the ceiling surface portion; and a rectangular window frame slidably mounted to the grooves of the pair of the rail members, the window frame being stored in the front surface portion or the ceiling surface portion, wherein the vertical portions of the rail members are directly fixed to the lateral side structural members, and the horizontal portions of the rail members are fixed to the lateral side structural members via intermediate members, wherein the intermediate members each include a stepped portion arranged substantially at a central position in a width direction thereof, and an upper side of the stepped portion of each of the intermediate members is fixed to a respective one of the lateral side structural members such that a lower side of the stepped portion is in a cantilevered state relative to the respective lateral side structural member, and the lower side of the stepped portion is fixed to a respective one of the rail members.

2. The cab for the work machine according to claim 1, wherein:

the rail members each have a bent portion for integrally connecting the vertical portion and the horizontal portion to each other.

3. The cab for the work machine according to claim 2, wherein:

the window frame has, at its four corners, sliding rollers that are inserted into the grooves of the rail members;

a lower end of the vertical portion of each of the rail members is provided with a curved portion that curves forward from the front surface portion;

the bent portion of each of the rail members is provided with a projected portion that projects toward a front side of the front surface portion; and the sliding rollers of the window frame are stored in the curved portions and the projected portions of the rail members when the window frame is mounted to the front surface portion.

4. The cab for the work machine according to claim 1, wherein:

the vertical portion of each of the rail members is arranged at a position offset from the axis of the lateral side structural member in a direction orthogonal to the axis, and is fixed to the lateral side structural member in a cantilevered state.

5. The cab for the work machine according to claim 1, wherein:

the window frame is provided with a lock mechanism for storing and fixing the window frame to the front surface portion or the ceiling surface portion;

the intermediate member is formed as an elongate plate extending along the horizontal portion of the rail member, and a front end and a rear end of the intermediate member are provided with a pair of tongue piece portions dangling down respectively in a vicinity of the front surface portion and in a vicinity of the rear surface portion;

an indoor side surface of each of the tongue piece portions is provided with an engaging pin that projects inwardly; and the window frame is stored and fixed in the front surface portion by engaging the lock mechanism with the engaging pin in the vicinity of the front surface portion, and the window frame is stored and fixed in the ceiling surface portion by engaging the lock mechanism with the engaging pin in the vicinity of the rear surface portion.

6. The cab for the work machine according to claim 2, wherein:

the vertical portion of each of the rail members is arranged at a position offset from the axis of the lateral side structural member in a direction orthogonal to the axis, and is fixed to the lateral side structural member in a cantilevered state.

7. The cab for the work machine according to claim 3, wherein:

the vertical portion of each of the rail members is arranged at a position offset from the axis of the lateral side structural member in a direction orthogonal to the axis, and is fixed to the lateral side structural member in a cantilevered state.

8. The cab for the work machine according to claim 2, wherein:

the window frame is provided with a lock mechanism for storing and fixing the window frame to the front surface portion or the ceiling surface portion;

the intermediate member is formed as an elongate plate extending along the horizontal portion of the rail member, and a front end and a rear end of the intermediate member are provided with a pair of tongue piece portions dangling down respectively in a vicinity of the front surface portion and in a vicinity of the rear surface portion;

an indoor side surface of each of the tongue piece portions is provided with an engaging pin that projects inwardly; and the window frame is stored and fixed in the front surface portion by engaging the lock mechanism with the engaging pin in the vicinity of the front surface portion, and the window frame is stored and fixed in the ceiling surface portion by engaging the lock mechanism with the engaging pin in the vicinity of the rear surface portion.

9. The cab for the work machine according to claim 3, wherein:

the window frame is provided with a lock mechanism for storing and fixing the window frame to the front surface portion or the ceiling surface portion;

the intermediate member is formed as an elongate plate extending along the horizontal portion of the rail member, and a front end and a rear end of the intermediate member are provided with a pair of tongue piece portions dangling down respectively in a vicinity of the front surface portion and in a vicinity of the rear surface portion;

an indoor side surface of each of the tongue piece portions is provided with an engaging pin that projects inwardly; and the window frame is stored and fixed in the front surface portion by engaging the lock mechanism with the engaging pin in the vicinity of the front surface portion, and the window frame is stored and fixed in the ceiling surface portion by engaging the lock mechanism with the engaging pin in the vicinity of the rear surface portion.

* * * * *